United States Patent [19]

Kunikane et al.

[11] Patent Number: 5,280,389

[45] Date of Patent: Jan. 18, 1994

[54] BALL LENS ASSEMBLY

[75] Inventors: Tatsuro Kunikane; Akira Okamoto; Saburo Uno, all of Kawasaki; Masahiko Uemura, Asahikawa, all of Japan

[73] Assignee: Fujitsu Limited, Kanagawa, Japan

[21] Appl. No.: 908,370

[22] Filed: Jul. 6, 1992

[30] Foreign Application Priority Data

Jul. 8, 1991 [JP] Japan .................................. 3-166838

[51] Int. Cl.⁵ .......................... G02B 3/00; G02B 7/02
[52] U.S. Cl. ..................................... 359/664; 359/820
[58] Field of Search ................................. 359/664, 820

[56] References Cited

U.S. PATENT DOCUMENTS 4,966,439 10/1990 Althaus et al. ..................... 359/820

FOREIGN PATENT DOCUMENTS 57-202510 11/1982 Japan .
1-291208 11/1989 Japan .

*Primary Examiner*—Scott J. Sugarman
*Attorney, Agent, or Firm*—Armstrong, Westerman, Hattori, McLeland & Naughton

[57] ABSTRACT

A ball lens assembly constructed of a lens holder formed with a press-fit hole having a circular section and a ball lens press-fitted with the press-fit hole of the lens holder. The lens holder is formed by sintering stainless steel powder. As the lens holder is formed by sintering, a force for press-fitting the ball lens into the lens holder can be suppressed to thereby effectively prevent breakage of the ball lens.

6 Claims, 3 Drawing Sheets

BALL LENS ASSEMBLY

BACKGROUND OF THE INVENTION

1. Field of the invention

The present invention relates to a ball lens assembly to be used in an optical device such as a light emitting device module or a light receiving device module.

2. Description of the Related Art

In the field of optical communication, a ball lens is widely used, so as to condense light emitted from a light emitting device or a light emitting end of an optical fiber and make the light enter a light entering end of an optical fiber, or so as to condense light emitted from the light emitting end of the optical fiber and make the light enter a light receiving device. The ball lens is not easy to fix and hold because it is spherical, and it is apt to break. Accordingly, these points must be considered in manufacturing a ball lens assembly.

It is known that the ball lens assembly is constructed by press-fitting the ball lens into a sectionally circular press-fit hole formed in a lens holder. In the use of such a ball lens assembly, a position of the ball lens relative to other optical parts such as a light emitting device can be decided by fixing the lens holder to a substrate or the like of an optical device.

In fixing the lens holder to the substrate, fixation by laser welding is effective so that aged displacement of the lens holder after fixed may be prevented. However, a metal material suitable for laser welding, such as stainless steel, is generally hard. Accordingly, in the case that the accuracy of interference (difference between an outer diameter of the ball lens and an inner diameter of the lens holder) is low, there is a possibility of the ball lens being broken. While the breakage of the ball lens during press-fitting thereof may be prevented by increasing the accuracy of the interference, it becomes not easy to manufacture the lens holder in this case, causing an increase in cost.

In view of the above problem, there has been proposed a structure of a ball lens assembly as shown in FIGS. 1A and 1B. This ball lens assembly is constructed of a composite lens holder and a ball lens 3 press-fitted in the composite lens holder. The composite lens holder is constructed of an outer cylindrical member 1 and an inner cylindrical member 2 fixed to the outer cylindrical member 1. The outer cylindrical member 1 is made of a weldable metal material such as stainless steel, and the inner cylindrical member 2 is made of a relatively soft metal material such as copper.

According to this ball lens assembly, laser welding to the substrate or any other metal parts is possible, and a force for press-fitting the ball lens into the composite lens holder can be suppressed even when the accuracy of the interference is low. However, this ball lens assembly is not easy to manufacture, still causing an increase in cost.

SUMMARY OF THE INVENTION

It is therefore an object of the present invention to provide a ball lens assembly which can be laser-welded to a substrate or any other metal parts, suppress a force for press-fitting a ball lens into a lens holder, and be easily manufactured.

In accordance with an aspect of the present invention, there is provided a ball lens assembly comprising a lens holder formed with a sectionally circular press-fit hole having a first diameter, said lens holder being formed by sintering stainless steel powder; and a ball lens press-fitted with said press-fit hole of said lens holder, said ball lens having a second diameter larger than said first diameter.

In general, sintered metal is lower in density (about 95%, for example) than a simple substance of its primary metal, so that the lens holder made of sintered metal is easily plastically deformed in press-fitting of the ball lens into the lens holder. Accordingly, a force required for press-fitting the ball lens into the lens holder can be suppressed according to the present invention. Further, as a primary component of the lens holder in the present invention is stainless steel, the lens holder can be laser-welded to a substrate or any other metal parts. Further, as the lens holder in the present invention is manufactured by sintering stainless steel powder, the manufacture of the lens holder is greatly easier as compared with the prior art wherein the lens holder is manufactured by cutting stainless steel.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1A:
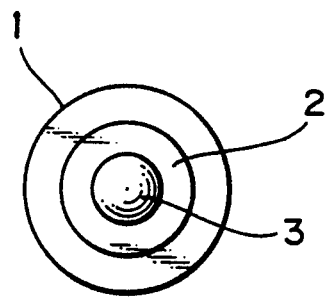
FIGS. 1A and 1B are a plan view and a vertical sectional view of a ball lens assembly in the prior art, respectively.
Figure 1B:
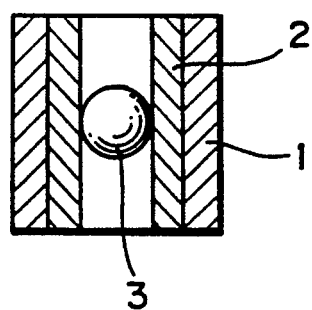
Figure 2A:
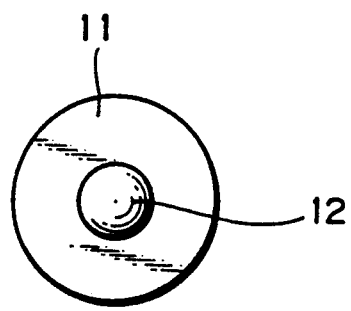
FIGS. 2A and 2B are a plan view and a vertical sectional view of a ball lens assembly according to a preferred embodiment of the present invention, respectively.
Figure 2B:
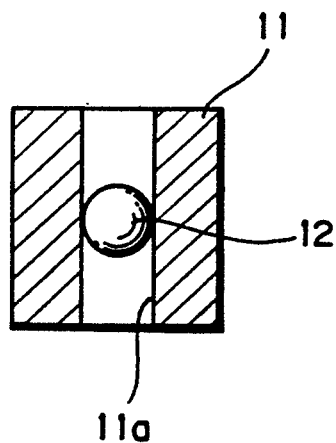

Referring to FIGS. 2A and 2B, there is shown a ball lens assembly according to a preferred embodiment of the present invention as viewed in plan and vertical section, respectively. The ball lens assembly is constructed of a cylindrical lens holder 11 having a press-fit hole 11a, and a ball lens 12 press-fitted with the press-fit hole 11a of the lens holder 11. The lens holder 11 is formed from a sintered body of stainless steel powder. The ball lens 12 has an outer diameter slightly larger than a diameter of the press-fit hole 11a.

The lens holder 11 may be manufactured by the following process.

First, zinc stearate is mixed in the ratio not greater than 1% into powder of stainless steel specified as SUS304L of Japanese Industrial Standards.

Then, the mixed powder is pressurized to temporarily form a cylindrical body. The condition at this time is 6−7 g/cc and 6.7 g/cc as a type value. Thereafter, the cylindrical body thus temporarily formed is heated at 1250° C. to be sintered.

The reason why the zinc stearate is mixed into the stainless steel powder in this manufacturing process is to prevent distortion of the shape of the cylindrical body upon compression forming. In the sintering step, a large part of the zinc stearate is dissipated out of the cylindrical body, so that there is no problem in quality of the lens holder. In the case that the material of the ball lens is glass specified as BK7, the press-fitting force is set to preferably 20 Kg or less.

Figure 3:
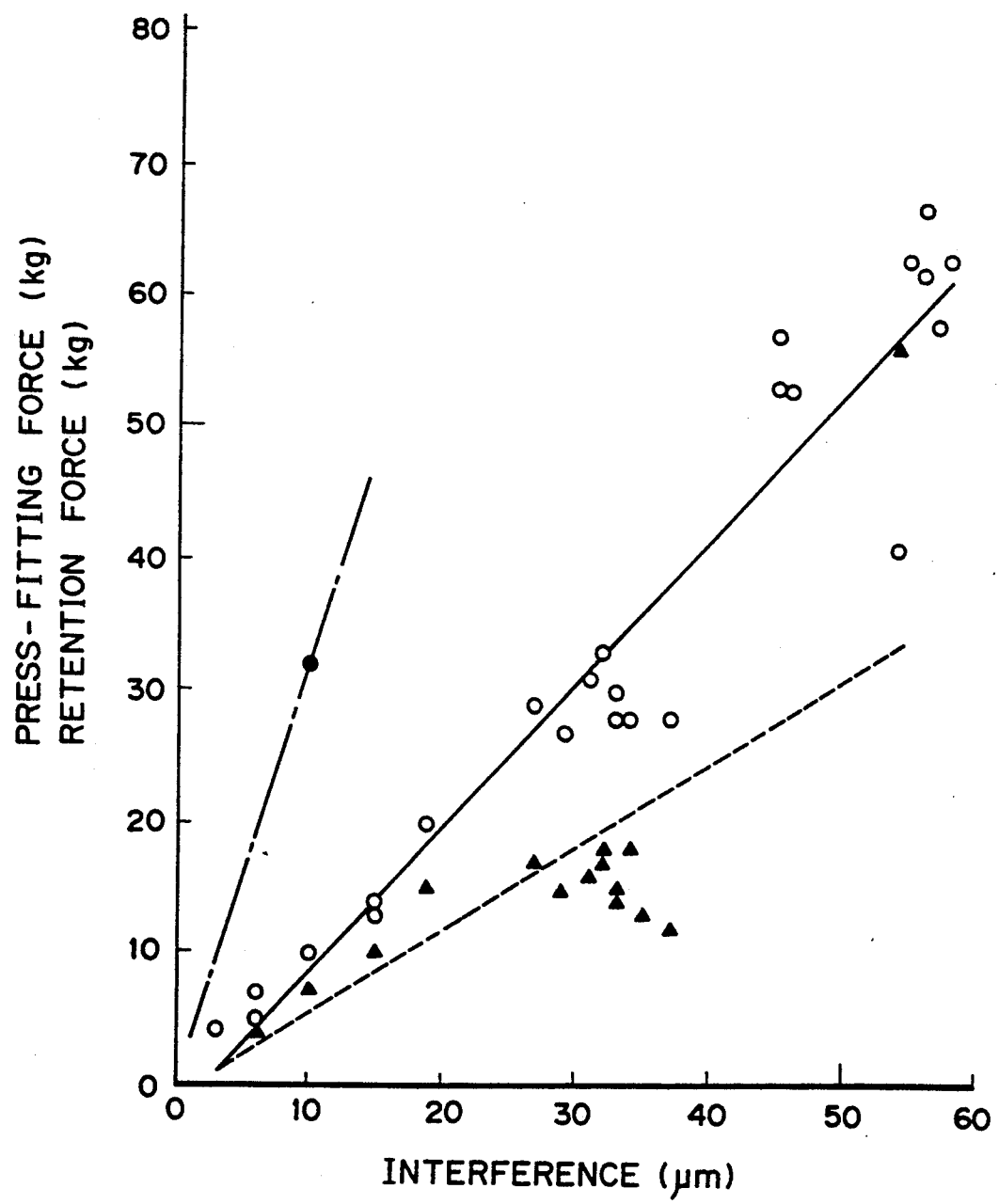
FIG. 3 is a graph showing a relationship among a press-fitting force, a retention force, and an interference.

FIG. 3 is a graph showing a relationship among a press-fitting force, a retention force, and an interference. The measurement was effected by using a ball lens having a diameter of 2.5 mm and a lens holder having an outer diameter of 6.5 mm with a press-fit hole having a length of 3.5 mm.

In FIG. 3, a phantom line shows the relationship between the press-fitting force and the interference in the case of using a conventional lens holder formed by cutting stainless steel; a solid line shows the relationship between the press-fitting force and the interference according to the preferred embodiment; and a broken line shows the relationship between the retention force and the interference according to the preferred embodiment. The press-fitting force means a minimum force necessary for press-fitting the ball lens into the lens holder, and the retention force means a minimum force necessary for removing the press-fitted ball lens out of the lens holder.

In this preferred embodiment, no cutting work is applied to the lens holder formed from a sintered body of stainless steel powder, so that no work hardening occurs. Further, since the lens holder is formed by sintering, a density of the lens holder is low, so that it is understood that the press-fitting force in this preferred embodiment is remarkably lower than that in the prior art.

In the case that the press-fitting force is intended to be suppressed to 20 Kg or less, so as to prevent breakage of the ball lens, it is necessary to suppress the interference to 5 $\mu$m or less in the prior art. To the contrary, it is only necessary to suppress the interference to 20 $\mu$m or less in this preferred embodiment. Thus, according to this preferred embodiment, an allowable range of the interference to be required for prevention of breakage of the ball lens can be widely expanded.

What is claimed is:

1. A ball lens assembly comprising:
   a lens holder formed with a sectionally circular press-fit hole having a first diameter, said lens holder being of sintered stainless steel formed by sintering stainless steel powder; and
   a ball lens press-fitted within said press-fit hole of said sintered stainless steel lens holder, said ball lens having a second diameter larger than said first diameter.

2. The ball lens assembly according to claim 1, wherein a difference between said first diameter and said second diameter is about 20 $\mu$m or less.

3. The ball lens assembly according to claim 2, wherein the difference between said first diameter and said second diameter is about 20 $\mu$m.

4. The ball lens assembly according to claim 1, wherein said sintered stainless steel lens holder is formed by sintering stainless steel powder with zinc stearate added thereto.

5. A ball lens assembly comprising:
   a sintered stainless steel lens holder having a circular press-fit hole of a first diameter formed therethrough, said sintered stainless steel lens holder being formed by mixing zinc stearate with stainless steel powder and sintering the zinc stearate and stainless steel powder mixture; and
   a ball lens press-fitted within the circular press-fit hole of said lens holder, said ball lens having a second diameter larger than the first diameter, a difference between the first diameter and the second diameter being about 20 $\mu$m or less.

6. The ball lens assembly according to claim 5, wherein the difference between said first diameter and said second diameter is about 20 $\mu$m.

* * * * *